(12) United States Patent
Guo et al.

(10) Patent No.: US 12,061,671 B2
(45) Date of Patent: Aug. 13, 2024

(54) DATA COMPRESSION TECHNIQUES FOR MACHINE LEARNING MODELS

(71) Applicant: EQUIFAX INC., Atlanta, GA (US)

(72) Inventors: Bo Guo, Duluth, GA (US); Rajkumar Bondugula, Irving, TX (US)

(73) Assignee: Equifax Inc., Atlanta, GA (US)

( * ) Notice: Subject to any disclaimer, the term of this patent is extended or adjusted under 35 U.S.C. 154(b) by 358 days.

(21) Appl. No.: 17/450,169

(22) Filed: Oct. 7, 2021

(65) Prior Publication Data

US 2023/0113118 A1    Apr. 13, 2023

(51) Int. Cl.
*G06N 20/00* (2019.01)
*G06F 18/214* (2023.01)

(52) U.S. Cl.
CPC ......... *G06F 18/2148* (2023.01); *G06N 20/00* (2019.01)

(58) Field of Classification Search
None
See application file for complete search history.

(56) References Cited

U.S. PATENT DOCUMENTS

| | | |
|---|---|---|
| 2015/0254566 A1 | 9/2015 | Chandramouli et al. |
| 2021/0173916 A1 | 6/2021 | Ortiz et al. |
| 2023/0153662 A1* | 5/2023 | Shrestha ............. H04L 63/1433 706/12 |
| 2023/0196136 A1* | 6/2023 | Campolong ........... G06N 20/00 706/12 |

FOREIGN PATENT DOCUMENTS

EP    3699827 A1    8/2020

OTHER PUBLICATIONS

PCT/US2022/077637, "International Search Report and Written Opinion", Jan. 30, 2023, 13 pages.

* cited by examiner

*Primary Examiner* — Dov Popovici
(74) *Attorney, Agent, or Firm* — Kilpatrick Townsend & Stockton LLP

(57) ABSTRACT

In some aspects, techniques for creating representative and informative training datasets for the training of machine-learning models are provided. For example, a risk assessment system can receive a risk assessment query for a target entity. The risk assessment system can compute an output risk indicator for the target entity by applying a machine learning model to values of informative attributes associated with the target entity. The machine learning model may be trained using training samples selected from a representative and informative (RAI) dataset. The RAI dataset can be created by determining the informative attributes based on attributes used by a set of models and further extracting representative data records from an initial training dataset based on the determined informative attributes. The risk assessment system can transmit a responsive message including the output risk indicator for use in controlling access of the target entity to an interactive computing environment.

14 Claims, 7 Drawing Sheets

DATA COMPRESSION TECHNIQUES FOR MACHINE LEARNING MODELS

TECHNICAL FIELD

The present disclosure relates generally to artificial intelligence. More specifically, but not by way of limitation, this disclosure relates to building and training machine learning models for predictions or performing other operations.

BACKGROUND

In machine learning, various models can be used to perform one or more functions (e.g., acquiring, processing, analyzing, and understanding various inputs in order to produce an output that includes numerical or symbolic information). For example, a neural network can be trained to take a set of attributes as input and produce an output based on the relationship between the attributes and the output indicated in the training data. Thus, the training data used to train the model can impact the performance of the machine learning model. If the training data contains predictive data, the trained machine learning model can generate more accurate predictions than models trained with less predictive training data. In addition, the training data can also determine the structure of the machine learning model. For example, for a neural network model, the input attributes in the training data can determine the input layer of the neural network.

However, it is often difficult to identify predictive data when generating the training data. Thus, training data for machine learning models often contain redundant and irrelevant data, leading to a large size of the training data. As a result, the computational complexity involved in the training of the machine learning models is higher than necessary and the prediction accuracy of the trained machine learning models is reduced due to the interference by the redundant and irrelevant data.

SUMMARY

Various aspects of the present disclosure provide systems and methods for creating representative and informative training datasets for the training of machine-learning models. In one example, a method includes receiving, from a remote computing device, a risk assessment query for a target entity, and computing, responsive to the risk assessment query, an output risk indicator for the target entity by applying a machine learning model to values of informative attributes associated with the target entity. The machine learning model is trained using training samples selected from a representative and informative (RAI) dataset. The RAI dataset comprises representative data records with each of the representative data records comprising the informative attributes. The RAI dataset is created by receiving an initial training dataset comprising a plurality of data records, each data record comprising a plurality of attributes; accessing model descriptions of a set of models that can be trained using the initial training dataset; determining the informative attributes from the plurality of attributes based on attributes used by the set of models according to the model descriptions; and generating the representative data records based on values of the informative attributes in the plurality of data records. The method further includes transmitting, to the remote computing device, a responsive message including the output risk indicator for use in controlling access of the target entity to one or more interactive computing environments.

In another example, a system includes a processing device and a memory device in which instructions executable by the processing device are stored for causing the processing device to perform operations. The operations include receiving, from a remote computing device, a risk assessment query for a target entity and computing, responsive to the risk assessment query, an output risk indicator for the target entity by applying a machine learning model to values of informative attributes associated with the target entity. The machine learning model is trained using training samples selected from a representative and informative (RAI) dataset. The RAI dataset comprises representative data records with each of the representative data records comprising the informative attributes. The RAI dataset is created by receiving an initial training dataset comprising a plurality of data records, each data record comprising a plurality of attributes; accessing model descriptions of a set of models that can be trained using the initial training dataset; determining the informative attributes from the plurality of attributes based on attributes used by the set of models according to the model descriptions; and generating the representative data records based on values of the informative attributes in the plurality of data records. The operations further include transmitting, to the remote computing device, a responsive message including the output risk indicator for use in controlling access of the target entity to one or more interactive computing environments.

In yet another example, a non-transitory computer-readable storage medium has program code stored thereupon that is executable by a processor device to cause a computing device to perform operations. The operations include computing, responsive to a risk assessment query for a target entity received from a remote computing device, an output risk indicator for the target entity by applying a machine learning model to values of informative attributes associated with the target entity. The machine learning model is trained using training samples selected from a representative and informative (RAI) dataset, and the RAI dataset comprises representative data records with each of the representative data records comprising the informative attributes. The RAI dataset is created by receiving an initial training dataset comprising a plurality of data records, each data record comprising a plurality of attributes; accessing model descriptions of a set of models that can be trained using the initial training dataset; determining the informative attributes from the plurality of attributes based on attributes used by the set of models according to the model descriptions; and generating the representative data records based on values of the informative attributes in the plurality of data records. The operations further include causing a responsive message including the output risk indicator to be transmitted to the remote computing device for use in controlling access of the target entity to one or more interactive computing environments.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

BRIEF DESCRIPTION OF THE DRAWINGS

The foregoing, together with other features and examples, will become more apparent upon referring to the following specification, claims, and accompanying drawings.

DETAILED DESCRIPTION

Figure 1:
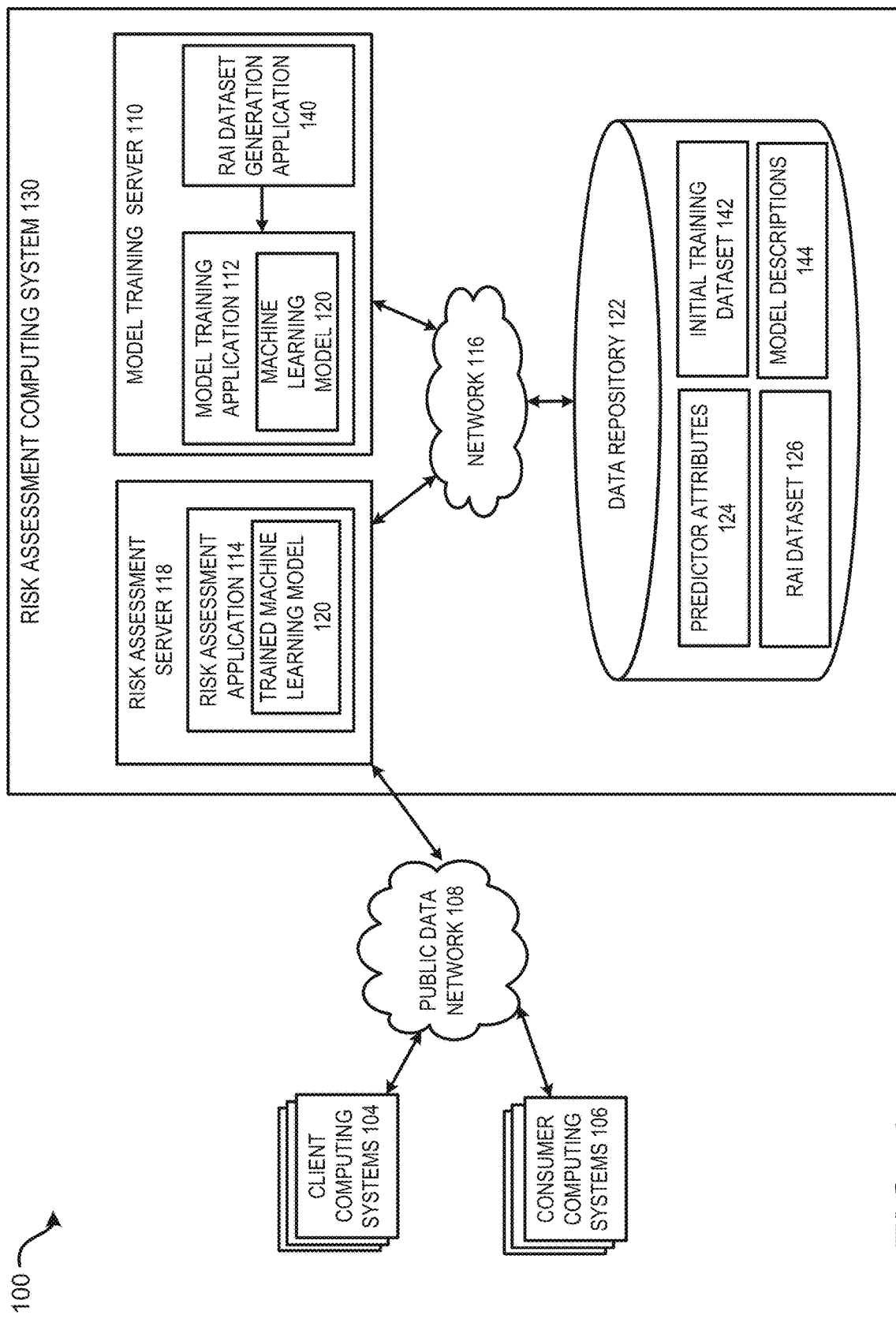
FIG. 1 is a block diagram depicting an example of an operating environment in which a representative and informative (RAI) dataset can be created and used to train a machine learning model for risk prediction, according to certain aspects of the present disclosure.

Some aspects of the disclosure relate to creating a representative and informative (RAI) dataset from a large-scale dataset for use in improving the training of machine-learning models. An example of a large-scale dataset can include 200 million data records with each data record having over 500 attributes. The RAI dataset creation process according to some examples presented herein can significantly reduce the computational complexity of machine learning models built based on the large-scale dataset and improve the prediction performance of the machine learning models by removing irrelevant and redundant data.

In one example, a model training server can collect model descriptions for a set of machine learning models that are trained or can be trained using an initial training dataset. The initial training dataset can include multiple data records with each data record containing multiple predictor attributes (or "attributes" in short). The set of machine learning models can include different types of models configured for different prediction tasks. Each machine learning model can be configured to generate an output based on input attributes. Since each model in the set of models can be trained using the initial training set, the input attributes for each of the models can include the attributes of the initial training set or a subset thereof. The model description for each machine learning model can describe the list of input attributes of the model, the output of the model, the type of the model, and other descriptions of the model, such as the criteria for applying the model. For example, a machine learning model can be a neural network configured to predict a failure or security risk of a group of servers executing a certain computing task based on the attributes of the group of servers. The attributes can include, for example, the number of servers in the group, the specification of each server, the logic relationship between the servers, and so on. In this example, the model description for this model can include a list of the attributes used by the model as input, the output as the server group failure or security risk, and the model type as a neural network. The model description can further describe that the criteria for applying the model are for a computing system including multiple servers and executing the specific computing task. In other words, the model is not intended to predict the system failure or security risk of a single server or servers executing other types of tasks.

Based on the model descriptions of the set of machine learning models, the model training server can generate a collection of input attributes for the set of models. The model training server can further remove duplicate input attributes in the collection and count the frequency of each attribute used by the set of models. For example, if an attribute, such as the CPU speed of a server, is used by ten models in the set of models as an input attribute, then the frequency for this attribute is ten. Based on the frequencies of the input attributes, the model training server can select informative attributes from the attributes of the initial training set as those attributes having a higher frequency (e.g., higher than a threshold value of frequency).

Based on the generated informative attributes, the model training server can evaluate the records in the initial training set by examining the informative attributes for each of the records and generate representative data records. For example, the model training server can generate a temporary data record for each data record in the initial training dataset by extracting the informative attributes from the corresponding data record. The model training server can further apply a clustering algorithm on the temporary data records to group the temporary data records into multiple clusters. One or more representative data records can be selected from each of the clusters to form the RAI training dataset. In some examples, the representative data records can be selected for each model to generate an RAI training dataset for that model. For instance, if a model is configured to predict a likelihood of a computer running a specific operating system being compromised or attacked, the model training server can extract temporary data records representing data for computers running such an operating system, and applying the clustering algorithm to extract the representative data records.

The RAI training dataset can be used to reconfigure and retrain the models in the set of models. For instance, the model training server can reconfigure an existing model in the set of models by removing the input attributes of the model that are not included in the informative attributes. In the example of a neural network mode, the reconfiguration can include removing the input nodes corresponding to the non-representative input attributes. The model training server can then retrain the reconfigured model using the RAI dataset. Alternatively, or additionally, the model training server can build a new model for the prediction task and train the new model using the RAI training dataset for this model.

In some examples, an RAI training dataset can be created for a particular modeling task corresponding to a category of models. Machine learning models can be classified into different categories based on the modeling tasks, such as models configured to predict aspects of different types of devices (e.g., laptop devices, smartphone devices, or server devices), models configured to predict aspects of devices executing different categories of tasks, models configured to predict aspects of devices executing different operating systems, and so on. For example, an RAI training dataset can be created for models built to make predictions for server devices and another RAI training dataset can be created for models built to make predictions for smartphone devices.

For a given modeling task, the initial training dataset can be filtered to extract data records that are relevant to the modeling task. For instance, if the modeling task is for predicting security risk associated with a server computer, the model training server can filter the initial training dataset to extract target data records relevant to server computers and remove data records for other types of computers. An RAI dataset can be created from these target data records. For example, the model training server can determine a set of potential models for the modeling task. In the above example where the prediction is for server computers, the set of potential models can include a model for predicting the security risk for a server computer that is over a certain number of years old, a model for predicting the security risk of a server computer having a certain type of operating system, a model for predicting the security risk of a server computer that has a CPU usage over 80% daily, a model for predicting the security risk of a server computer having a certain type of CPU, a model for predicting the security risk of a server computer that is installed with a certain type of virus protection software, and so on.

For each of the potential models, the model training server can extract a set of target data records from the initial training dataset. The extraction can be performed by filtering the initial training dataset according to the model description of the potential mode to select relevant data records from the initial training dataset. The extracted relevant data records can be further compressed, such as through clustering, to identify representative data records as the set of target data records. In some implementations, the model training server can identify a subset of the initial training dataset from which the target data records for each potential model are extracted. The subset of the training dataset can be created through clustering to select representative data records. In this way, the set of target data records for each potential model can be created from the subset which has a size smaller than the initial training dataset, and thus the computational complexity of generating the sets of target data records can be reduced.

To create the RAI dataset, the model training server can determine the input attributes of the set of potential models to identify informative attributes. For potential models that are existing models, the input attributes of these models can be obtained from the respective model descriptions. For a potential model that has not been built or needs to be rebuilt, the model training server can create and train a proxy model using the corresponding target data records. The proxy model can be a model that is simple and requires fewer computations than the actual model to be built and trained. For example, the proxy model can be a decision tree model whose training complexity is linear to the number of attributes and the number of records in the target data records. Alternatively, or additionally, a proxy model can be built using representative attributes determined above from the target data records. The input attributes selected by the proxy model can be used as the input attributes for the potential model for RAI dataset building purposes. In some examples, even if a potential model has been built, the model training server can still build a proxy model for the model to determine the input attributes for the potential model.

Based on the input attributes determined for the set of potential models through the model description or the proxy models, the model training server can determine a collection of input attributes and further determine the frequency of each input attribute used by the set of models. Based on the frequency, representative attributes can be determined to be attributes that are used more often than others by the potential models, such as attributes having a frequency higher than a threshold value.

To generate representative data records, the model training server can identify, for example, through clustering representative data records for each potential model from the initial training dataset using the informative attributes. The collection of the representative data records for the set of potential models can be output as the RAI dataset for the particular modeling task. Because the RAI dataset is built based on multiple potential models for the particular modeling task, the RAI dataset can cover a variety of use cases and be used to train any machine learning model built for the particular modeling task.

In some aspects, the machine learning model trained using the RAI dataset can be utilized to satisfy risk assessment queries. For example, a machine learning model can be built and trained to predict a risk associated with a computing device accessing an online environment based on the attributes associated with the computing device, such as the model of the device, operating system, the workload, the CPU, the software installed, and so on. For a risk assessment query for a target entity or device, an output risk indicator for the target entity or device can be computed by applying the trained machine learning model to predictor attributes associated with the target entity or device. The output risk indicator can be used to control access of the target entity or device to one or more interactive computing environments.

As described herein, certain aspects provide improvements to machine learning by providing representative and informative data for the training of the machine learning models. The initial training dataset can be analyzed based on the models or potential models that are trained or can be trained using the initial training set to determine the informative attributes and to remove irrelevant or less relevant attributes from the training dataset. Further, representative data records can be determined from the initial training dataset through clustering to remove redundancy in the training dataset records. As a result, the generated RAI dataset is much smaller than the initial training dataset but retains the predictive attributes and data records. The RAI dataset can thus reduce the complexity of the structure of the machine learning model by requiring fewer nodes or branches in the model because fewer attributes are used. The RAI dataset can also significantly reduce the computational complexity of training the machine learning models by including significantly fewer attributes and data records. Because the RAI dataset includes informative and representative data in the initial training dataset, the training of the machine learning model is more focused without interference from irrelevant data. As such, the prediction performance of the machine learning models trained using the RAI dataset can also be improved.

Additional or alternative aspects can implement or apply rules of a particular type that improve existing technological processes involving machine-learning techniques. For instance, to determine the informative attributes, a particular set of rules are employed to ensure the correct set of informative attributes are extracted, such as the rules for identifying a target set of data records for each potential model, rules for determining frequencies of the input attributes of the potential models, rules for selecting the informative attributes based on the frequencies. This particular set of rules allows the informative attributes selected for a particular modeling task or a set of models. Furthermore, additional rules are used to identify representative data records for each model based on the identified informative attributes. These particular rules enable the representative data records extracted for the model to fit the particular modeling task.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

FIG. 1 is a block diagram depicting an example of an operating environment 100 in which a representative and informative (RAI) dataset 126 can be created and used to train a machine learning model 120 for risk prediction, according to certain aspects of the present disclosure. In this operating environment 100, a risk assessment computing system 130 builds and trains a machine learning model 120 that can be utilized to predict risk indicators of various entities based on predictor attributes 124 associated with the respective entity. The risk assessment computing system 130 may train the machine learning model 120 using an RAI dataset 126 that can be generated from an initial training dataset 142. FIG. 1 depicts examples of hardware components of a risk assessment computing system 130, according to some aspects. The risk assessment computing system 130 is a specialized computing system that may be used for processing large amounts of data using a large number of computer processing cycles. The risk assessment computing system 130 can include a model training server 110 for generating an RAI dataset and for building and training a machine learning model 120 for predicting risk indicators. The risk assessment computing system 130 can further include a risk assessment server 118 for performing risk assessment for given predictor attributes 124 using the trained machine learning model 120.

The model training server 110 can include one or more processing devices that execute program code, such as a model training application 112 or an RAI dataset generation application 140. The program code is stored on a non-transitory computer-readable medium. The RAI dataset generation application 140 may generate an RAI dataset 126. The model training application 112 can execute one or more processes to train and optimize a machine learning model 120.

In some examples, the RAI dataset generation application 140 can generate the RAI dataset 126 by utilizing an initial training dataset 142. The initial training dataset 142 can include multiple data records with each data record containing multiple attributes. The RAI dataset generation application 140 may extract certain data records from the initial training dataset 142 to generate the RAI dataset 126 by filtering the initial training dataset 142 according to model descriptions 144 for the machine learning model 120. The initial training dataset 142 can be stored in one or more network-attached storage units on which various repositories, databases, or other structures are stored. Examples of these data structures include the data repository 122.

Network-attached storage units may store a variety of different types of data organized in a variety of different ways and from a variety of different sources. For example, the network-attached storage unit may include storage other than primary storage located within the model training server 110 that is directly accessible by processors located therein. In some aspects, the network-attached storage unit may include secondary, tertiary, or auxiliary storage, such as large hard drives, servers, virtual memory, among other types. Storage devices may include portable or non-portable storage devices, optical storage devices, and various other mediums capable of storing and containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as a compact disk or digital versatile disk, flash memory, memory, or memory devices.

In some examples, the RAI dataset 126 can be generated from an initial training dataset 142 associated with various data records, such as users or organizations. The initial training dataset 142 can include attributes of each of the data records. For example, the initial training dataset 142 can include M rows and N columns for M data records with N attributes, each row representing a data record, and each column representing an attribute of the data record, wherein M and N are positive integer numbers. The initial training data for each data record can also be represented as a vector with N elements/attributes. In some scenarios, the initial training dataset 142 includes a large-scale data set, such as 200 million rows or vectors and each row/vector having more than 1000 attributes. The initial training dataset 142 can also be stored in the data repository 122. To generate the RAI dataset 126, the model training server 110 can execute an RAI dataset generation application 140 configured to extract attributes that are informative attributes and representative data records. Additional details regarding determining RAI datasets 126 from an initial training dataset 142 are provided with regard to FIGS. 3-6.

Note that while FIG. 1 and the above description show that the RAI dataset generation application 140 is executed by the model training server 110, the RAI dataset generation application 140 can be executed on another device separate from the model training server 110.

The risk assessment server 118 can include one or more processing devices that execute program code, such as a risk assessment application 114. The program code is stored on a non-transitory computer-readable medium. The risk assessment application 114 can execute one or more processes to utilize the machine learning model 120 trained by the model training application 112 to predict risk indicators for entities based on input predictor attributes 124 associated with the respective entities.

Furthermore, the risk assessment computing system 130 can communicate with various other computing systems, such as client computing systems 104. For example, client computing systems 104 may send risk assessment queries to the risk assessment server 118 for risk assessment, or may send signals to the risk assessment server 118 that control or otherwise influence different aspects of the risk assessment computing system 130. The client computing systems 104 may also interact with consumer computing systems 106 via one or more public data networks 108 to facilitate electronic transactions between users of the consumer computing systems 106 and interactive computing environments provided by the client computing systems 104.

Each client computing system 104 may include one or more third-party devices, such as individual servers or groups of servers operating in a distributed manner. A client computing system 104 can include any computing device or group of computing devices operated by a seller, lender, or other providers of products or services. The client computing system 104 can include one or more server devices. The one or more server devices can include or can otherwise access one or more non-transitory computer-readable media. The client computing system 104 can also execute instructions that provide an interactive computing environment accessible to consumer computing systems 106. Examples of the interactive computing environment include a mobile application specific to a particular client computing system 104, a web-based application accessible via a mobile device, etc. The executable instructions are stored in one or more non-transitory computer-readable media.

The client computing system 104 can further include one or more processing devices that are capable of providing the interactive computing environment to perform operations described herein. The interactive computing environment can include executable instructions stored in one or more non-transitory computer-readable media. The instructions providing the interactive computing environment can configure one or more processing devices to perform operations described herein. In some aspects, the executable instructions for the interactive computing environment can include instructions that provide one or more graphical interfaces. The graphical interfaces are used by a consumer computing system 106 to access various functions of the interactive computing environment. For instance, the interactive computing environment may transmit data to and receive data from a consumer computing system 106 to shift between different states of the interactive computing environment, where the different states allow one or more electronics transactions between the mobile device 102 and the client computing system 104 to be performed.

A consumer computing system 106 can include any computing device or other communication device operated by a user, such as a consumer or a customer. The consumer computing system 106 can include one or more computing devices, such as laptops, smartphones, and other personal computing devices. A consumer computing system 106 can include executable instructions stored in one or more non-transitory computer-readable media. The consumer computing system 106 can also include one or more processing devices that are capable of executing program code to perform operations described herein. In various examples, the consumer computing system 106 can allow a user to access certain online services from a client computing system 104, to engage in mobile commerce with a client computing system 104, to obtain controlled access to electronic content hosted by the client computing system 104, etc.

For instance, the user can use the consumer computing system 106 to engage in an electronic transaction with a client computing system 104 via an interactive computing environment. An electronic transaction between the consumer computing system 106 and the client computing system 104 can include, for example, the consumer computing system 106 being used to query a set of sensitive or other controlled data, access online financial services provided via the interactive computing environment, submit an online credit card application or other digital application to the client computing system 104 via the interactive computing environment, operating an electronic tool within an interactive computing environment hosted by the client computing system (e.g., a content-modification feature, an application-processing feature, etc.).

In some aspects, an interactive computing environment implemented through a client computing system 104 can be used to provide access to various online functions. As a simplified example, a website or other interactive computing environment provided by an online resource provider can include electronic functions for requesting computing resources, online storage resources, network resources, database resources, or other types of resources. In another example, a website or other interactive computing environment provided by a financial institution can include electronic functions for obtaining one or more financial services, such as loan application and management tools, credit card application and transaction management workflows, electronic fund transfers, etc. A consumer computing system 106 can be used to request access to the interactive computing environment provided by the client computing system 104, which can selectively grant or deny access to various electronic functions. Based on the request, the client computing system 104 can collect data associated with the user and communicate with the risk assessment server 118 for risk assessment. Based on the risk indicator predicted by the risk assessment server 118, the client computing system 104 can determine whether to grant the access request of the consumer computing system 106 to certain features of the interactive computing environment.

In a simplified example, the system depicted in FIG. 1 can configure a machine learning model 120 to be used for accurately determining risk indicators, such as credit scores, using predictor attributes 124. A predictor attribute 124 can be any variable predictive of risk that is associated with an entity. Any suitable predictor attribute 124 that is authorized for use by an appropriate legal or regulatory framework may be used.

Examples of predictor attributes 124 used for predicting the risk associated with an entity accessing online resources include, but are not limited to, attributes indicating the demographic characteristics of the entity (e.g., name of the entity, the network or physical address of the company, the identification of the company, the revenue of the company), attributes indicative of prior actions or transactions involving the entity (e.g., past requests of online resources submitted by the entity, the amount of online resource currently held by the entity, and so on), attributes indicative of one or more behavioral traits of an entity (e.g., the timeliness of the entity releasing the online resources), etc. Similarly, examples of predictor attributes 124 used for predicting the risk associated with an entity accessing services provided by a financial institute include, but are not limited to, indicative of one or more demographic characteristics of an entity (e.g., age, gender, income, etc.), attributes indicative of prior actions or transactions involving the entity (e.g., information that can be obtained from credit files or records, financial records, consumer records, or other data about the activities or characteristics of the entity), attributes indicative of one or more behavioral traits of an entity, etc.

The predicted risk indicator can be utilized by the service provider to determine the risk associated with the entity accessing a service provided by the service provider, thereby granting or denying access by the entity to an interactive computing environment implementing the service. For example, if the service provider determines that the predicted risk indicator is lower than a threshold risk indicator value, then the client computing system 104 associated with the service provider can generate or otherwise provide access permission to the consumer computing system 106 that requested the access. The access permission can include, for example, cryptographic keys used to generate valid access credentials or decryption keys used to decrypt access credentials. The client computing system 104 associated with the service provider can also allocate resources to the user and provide a dedicated web address for the allocated resources to the consumer computing system 106, for example, by adding it in the access permission. With the obtained access credentials and/or the dedicated web address, the consumer computing system 106 can establish a secure network connection to the computing environment hosted by the client computing system 104 and access the resources via invoking API calls, web service calls, HTTP requests, or other proper mechanisms.

Each communication within the operating environment 100 may occur over one or more data networks, such as a public data network 108, a network 116 such as a private data network, or some combination thereof. A data network may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or a combination of wireless interfaces. A wired network may include a wired interface. The wired or wireless networks may be implemented using routers, access points, bridges, gateways, or the like, to connect devices in the data network.

The number of devices depicted in FIG. 1 is provided for illustrative purposes. Different numbers of devices may be used. For example, while certain devices or systems are shown as single devices in FIG. 1, multiple devices may instead be used to implement these devices or systems. Similarly, devices or systems that are shown as separate, such as the model training server 110 and the risk assessment server 118, may be instead implemented in a signal device or system.

Figure 2:
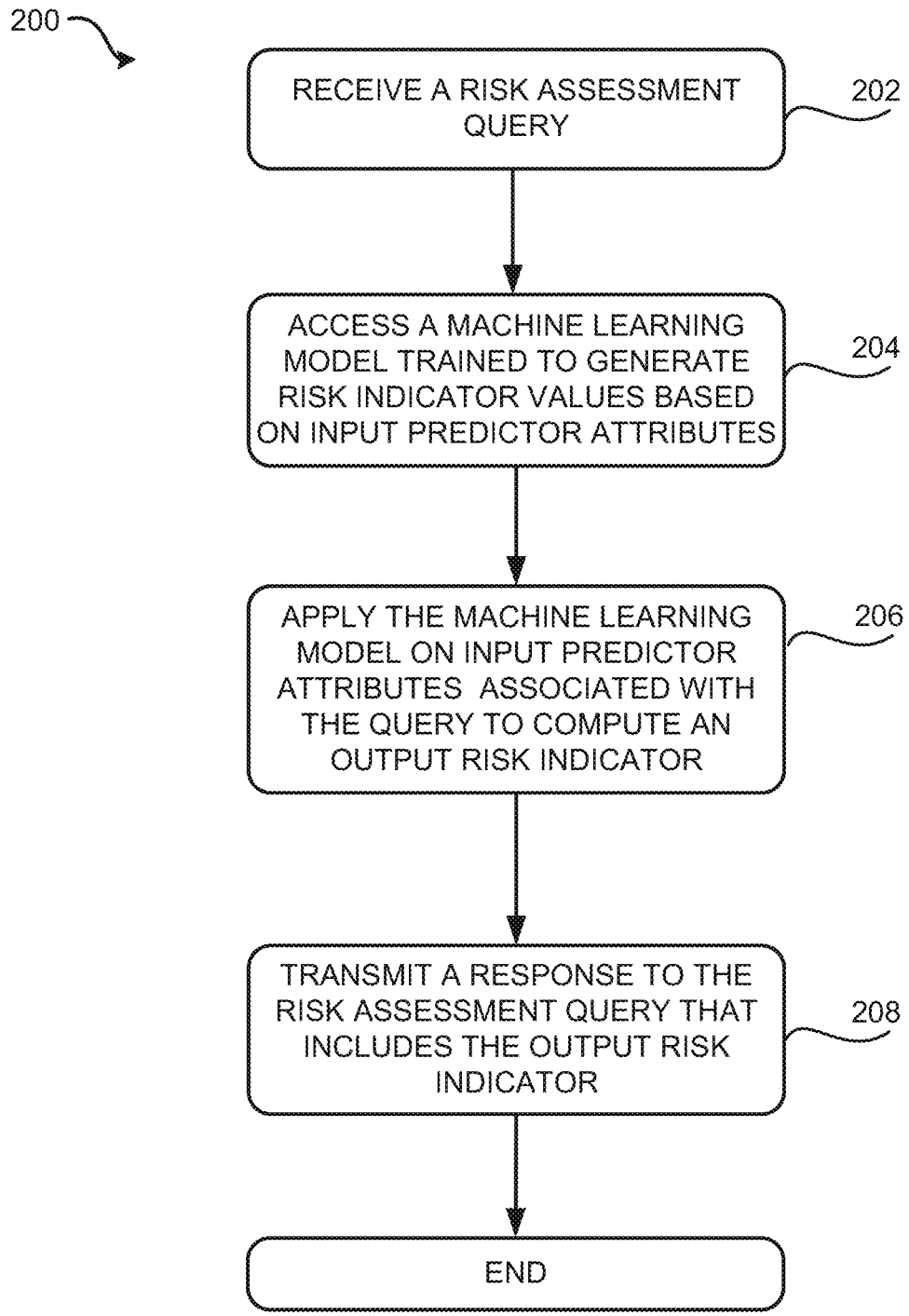
FIG. 2 is a flow chart depicting an example of a process for utilizing a machine learning model trained with an RAI dataset to generate risk indicators for a target entity based on predictor attributes associated with the target entity, according to certain aspects of the present disclosure.

FIG. 2 is a flow chart depicting an example of a process 200 for utilizing a machine learning model 120 trained with RAI dataset 126 to generate risk indicators for a target entity based on predictor attributes 124 associated with the target entity, according to certain aspects of the present disclosure. One or more computing devices (e.g., the risk assessment server 118) implement operations depicted in FIG. 2 by executing suitable program code (e.g., the risk assessment application 114). For illustrative purposes, the process 200 is described with reference to certain examples depicted in the figures. Other implementations, however, are possible.

At operation 202, the process 200 involves receiving a risk assessment query for a target entity from a remote computing device, such as a computing device associated with the target entity requesting the risk assessment. The risk assessment query can also be received from a remote computing device associated with an entity authorized to request risk assessment of the target entity.

At operation 204, the process 200 involves accessing a machine learning model 120 trained to generate risk indicator values based on inputted predictor attributes 124 or other data suitable for assessing risks associated with an entity. The machine learning model 120 may be trained with an RAI dataset 126 including the predictor attributes 124. Examples of predictor attributes 124 can include data associated with an entity that describes prior actions or transactions involving the entity (e.g., information that can be obtained from credit files or records, financial records, consumer records, or other data about the activities or characteristics of the entity), behavioral traits of the entity, demographic traits of the entity, or any other traits that may be used to predict risks associated with the entity. In some aspects, predictor attributes 124 can be obtained from credit files, financial records, consumer records, etc. The risk indicator can indicate a level of risk associated with the entity, such as a credit score of the entity.

The machine learning model 120 can be constructed and trained using attributes included in the RAI dataset 126. In some examples, the machine learning model 120 can be a neural network model that includes an input layer having N nodes each corresponding to a training attribute in an N-dimension input predictor vector. The neural network can further include one or more hidden layers and an output layer containing one or more outputs. Depending on the type of the machine learning model 120, training algorithms such as backpropagation can be used to train the machine learning model 120 based on the RAI dataset 126. Other types of models can also be utilized, such as a decision tree model, a random forest model, and so on.

At operation 206, the process 200 involves applying the machine learning model 120 to generate a risk indicator for the target entity specified in the risk assessment query. Predictor attributes 124 associated with the target entity can be used as inputs to the machine learning model 120. The predictor attributes 124 associated with the target entity can be obtained from a predictor attribute database configured to store predictor attributes 124 associated with various entities. The output of the machine learning model 120 would include the risk indicator for the target entity based on its current predictor attributes 124.

At operation 208, the process 200 involves generating and transmitting a response to the risk assessment query and the response can include the risk indicator generated using the machine learning model 120. The risk indicator can be used for one or more operations that involve performing an operation with respect to the target entity based on a predicted risk associated with the target entity. In one example, the risk indicator can be utilized to control access to one or more interactive computing environments by the target entity. As discussed above with regard to FIG. 1, the risk assessment computing system 130 can communicate with client computing systems 104, which may send risk assessment queries to the risk assessment server 118 to request risk assessment. The client computing systems 104 may be associated with banks, credit unions, credit-card companies, insurance companies, or other financial institutions and be implemented to provide interactive computing environments for customers to access various services offered by these institutions. Customers can utilize consumer computing systems 106 to access the interactive computing environments thereby accessing the services provided by the financial institution.

For example, a customer can submit a request to access the interactive computing environment using a consumer computing system 106. Based on the request, the client computing system 104 can generate and submit a risk assessment query for the customer to the risk assessment server 118. The risk assessment query can include, for example, an identity of the customer and other information associated with the customer that can be utilized to generate predictor variables. The risk assessment server 118 can perform a risk assessment based on predictor attributes 124 generated for the customer and return the predicted risk indicator to the client computing system 104.

Based on the received risk indicator, the client computing system 104 can determine whether to grant the customer access to the interactive computing environment. If the client computing system 104 determines that the level of risk associated with the customer accessing the interactive computing environment and the associated financial service is too high, the client computing system 104 can deny access by the customer to the interactive computing environment. Conversely, if the client computing system 104 determines that the level of risk associated with the customer is acceptable, the client computing system 104 can grant the access to the interactive computing environment by the customer and the customer would be able to utilize the various financial services provided by the financial institutions. For example, with the granted access, the customer can utilize the consumer computing system 106 to access web pages or other user interfaces provided by the client computing system 104 to query data, submit an online digital application, operate electronic tools, or perform various other operations within the interactive computing environment hosted by the client computing system 104.

Figure 3:
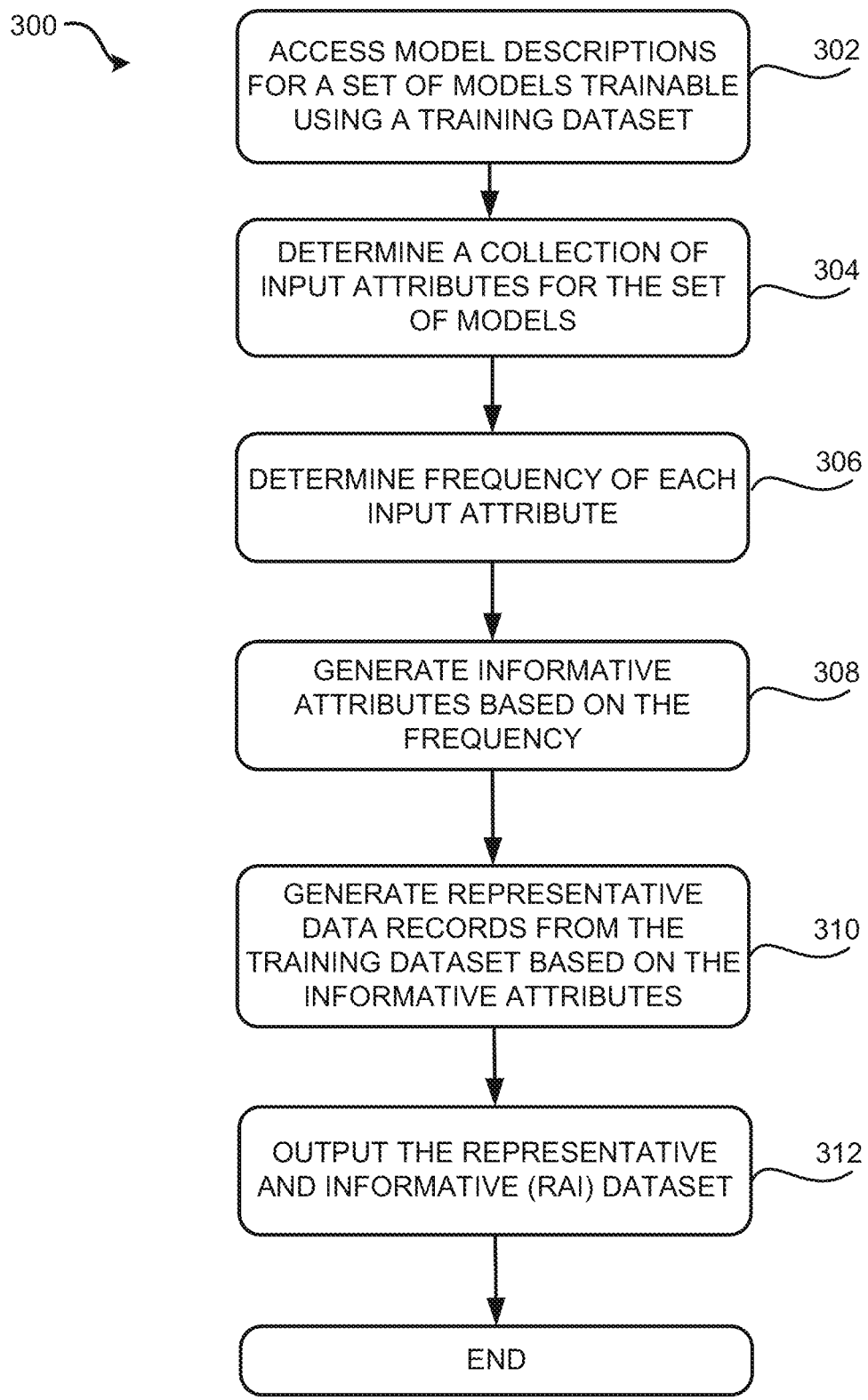
FIG. 3 is a flow chart depicting an example of a process for generating representative and informative datasets, according to certain aspects of the present disclosure.

Referring now to FIG. 3, a flow chart depicting an example of a process 300 for generating a representative and informative (RAI) dataset 126 is presented. One or more computing devices (e.g., the model training server 110) implement operations depicted in FIG. 3 by executing suitable program code (e.g., the RAI dataset generation application 140). For illustrative purposes, the process 300 is described with reference to certain examples depicted in the figures. Other implementations, however, are possible.

At block 302 the process 300 can include accessing, by the RAI dataset generation application 140 in the model training server 110, model descriptions 144 for a set of machine learning models that are trainable using an initial training dataset 142. Each machine learning model may be associated with a model description 144. The model descriptions are further described in FIG. 4 below. The initial training dataset 142 may include multiple data records with each data record containing multiple predictor attributes. The data records and attributes are further described in FIG. 5 below. The set of machine learning models may each be trained or trainable with the attributes of the initial training dataset 142 or a subset thereof to generate an output.

Figure 4:
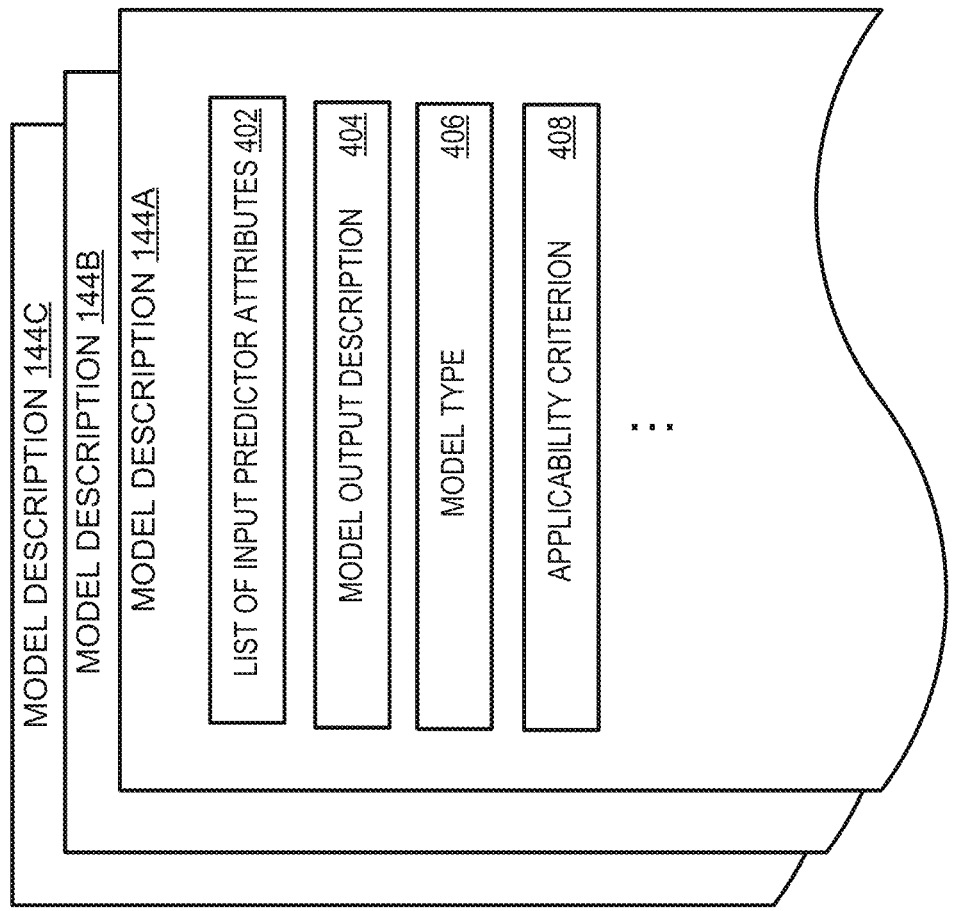
FIG. 4 is a diagram depicting an example of the data structure of model descriptions, according to certain aspects of the present disclosure.

FIG. 4 is a data structure diagram showing a number of data elements stored in a data structure, according to certain aspects of the present disclosure. It will be appreciated by one skilled in the art that the data structure shown in the figure may represent a record stored in a database table, an object stored in computer memory, a programmatic structure, or any other data container commonly known in the art. Each data element included in the data structure may represent one or more fields or columns of a database record, one or more attributes of an object, one or more member variables of a programmatic structure, or any other unit of data of a data structure commonly known in the art. The implementation is a matter of choice, and may depend on the technology, performance, and other requirements of the computing system upon which the data structures are implemented.

Specifically, FIG. 4 shows one example of data elements that may be stored in the model descriptions 144A-C. As described above, the data elements may include a list of input predictor attributes 402, a model output description 404, a model type 406, applicability criterion 408, etc. In one example, a machine learning model of the set of machine learning models may be a neural network configured to predict a failure or security risk of a group of servers executing a certain computing task based on the attributes of the group of servers, such as the number of servers in the group, the specification of each server, the logic relationship between the servers, and so on. In this example, the model description 144A for this machine learning model may include a list of input predictor attributes 402 including the number of servers, the specification of each server, etc. The model output description 404 may describe that the model is for a prediction of the failure or security risk of the group of servers executing the certain computing task. Model type 406 may indicate that the model is a neural network model. The applicability criterion 408 may detail criteria for applying the model, such as that the neural network is to be used to specifically predict the system failure or security risk of a group of servers rather than the system failure or security risk of a single server.

In another example, a machine learning model in the set of machine learning models may be a logistic regression model configured to predict a credit score of an individual based on the attributes of the individual, such as the account balance of the individual, the utilization of the account credit, the number of times that the individual has failed to make payment on time, and so on. In this example, the model description 144A for this machine learning model may include a list of input predictor attributes 402 including the number of untimely payments, the income, the balance, etc. The model output description 404 may describe that the output of the model is a prediction of the credit score of an individual. The model type 406 may indicate that the model is a logistic regression model. The applicability criterion 408 may detail criteria for applying the model, such as that the logistic regression model is to be used to specifically predict the credit score of an individual. Other examples may include more or fewer data elements.

Figure 5:
FIG. 5 is a diagram illustrating an example of an initial training dataset and the representative and informative dataset created therefrom, according to certain aspects of the present disclosure.

FIG. 5 is a diagram illustrating an example of an initial training dataset 500 and an RAI dataset created therefrom, according to certain aspects of the present disclosure. In this example, the initial training dataset 500 includes M rows representing data records and N columns representing N attributes, where M and N are positive integer numbers. In some examples, the initial training dataset 500 includes a large-scale training dataset, such as 200 million rows and each row having more than 1000 attributes.

Referring back to FIG. 3, at block 304 the process 300 involves determining, by the RAI dataset generation application 140, a collection of input attributes for the set of machine learning models. The RAI dataset generation application 140 can determine the collection of input attributes based on the model descriptions 144. The collection of input attributes may include some or all of the data elements in the model descriptions 144 for the set of machine learning models. Using the example described in FIG. 4, the collection of input attributes may include predictor attributes from the list of input predictor attributes 402 for each machine learning model in the set of machine learning models.

At block 306, the process 300 involves determining, by the RAI dataset generation application 140, the frequency of each input attribute. For a given attribute, the RAI dataset generation application 140 can determine the frequency by determining how many models use the given attribute as an input attribute. For example, if an input attribute is used by ten machine learning models of the set of machine learning models, the frequency is ten. Input attributes with higher frequency may indicate that the input attributes are beneficial for training the set of machine learning models. Additionally, the RAI dataset generation application 140 may remove the duplicate input attributes from the collection of input attributes.

At block 308, the process 300 involves generating, by the RAI dataset generation application 140, informative attributes based on the frequency. For example, if the frequency of a certain input attribute is higher than a threshold frequency, the RAI dataset generation application 140 can generate an informative attribute that is based on that input attribute. The RAI dataset generation application 140 may thus generate a collection of informative attributes from the collection of input attributes.

At block 310, the process 300 involves generating, by the RAI dataset generation application 140, representative data records from the initial training dataset 142 based on the informative attributes. The RAI dataset generation application 140 may form an RAI dataset 126 out of the representative data records. Referring to the example of the initial training dataset 500 depicted in FIG. 5, the shaded blocks may be data records that include the informative attributes determined in block 308. For each shaded block, the RAI dataset generation application 140 may generate a temporary data record that includes the informative attributes for each of the data records 1-N or by removing the attributes that are not identified as the informative attributes from each data record.

In some examples, the RAI dataset generation application 140 may further apply a clustering algorithm onto the temporary data records to group the temporary data records into multiple clusters. For example, high dimensional clustering may be used. The high dimensional clustering involves a modified bisecting K-means algorithm and includes multiple iterations with each iteration splitting a cluster into two according to a splitting criterion. The splitting criterion can be configured to select the largest cluster (i.e., containing the largest number of data points) or the widest cluster among the existing clusters for splitting. The width of a cluster can be measured by the radius of the cluster and the cluster having the largest radius is the widest cluster. The process continues until certain termination conditions are satisfied. The termination conditions can include, for example, a maximum number of iterations has reached, a maximum number of clusters has been generated, or all the clusters have at most a predetermined number of samples. Additional details about the high dimensional clustering are provided in U.S. patent application Ser. No. 16/875,658 filed May 15, 2020, the entirety of which is hereby incorporated by reference.

Based on the identified clusters, the RAI dataset generation application 140 may select one or more representative data records from each of the clusters to form the RAI dataset 126. For example, the one or more representative data records may be selected from the clusters based on predetermined specifications, such as selecting 5-10% of the data records from the initial training dataset 500 to be representative data records, or selecting a fixed number of data records from the initial training dataset 500, such as 1 million representative data records. The selected data records and attributes are depicted in FIG. 5 as shaded blocks.

In some examples, the RAI dataset 126 may not be specifically generated for a single machine learning model of the set of machine learning models. That is, the RAI dataset 126 may be generated for the entire set of machine learning models. Alternatively, the RAI dataset 126 may be generated for a specific machine learning model. In some examples, different RAI datasets 126 may be generated for each machine learning model of the set of machine learning models. For instance, if a machine learning model is configured to predict a likelihood of a failure or security risk of a computer running a specific operating system, the RAI dataset generation application 140 can extract temporary data records representing data for computers running such an operating system, and can apply the clustering algorithm to extract the representative data records.

At block 312, the process 300 involves outputting, by the RAI dataset generation application 140, the RAI dataset 126. For example, the RAI dataset generation application 140 can output the RAI dataset 126 to the model training application 112 for use in training a machine learning model 120. If the machine learning model 120 has already been trained with the initial training dataset 142, the model training application 112 may reconfigure and retrain the machine learning model 120 using the RAI dataset 126. For example, the model training application 112 may remove the input attributes of the machine learning model 120 that are not included in the RAI dataset 126. Alternatively or additionally, the model training application 112 may generate a new machine learning model 120 and training this new model with the RAI dataset 126. The model training server 110 may transmit the trained machine learning model 120 to the risk assessment server 118 to generate risk indicators for a target entity.

Figure 6:
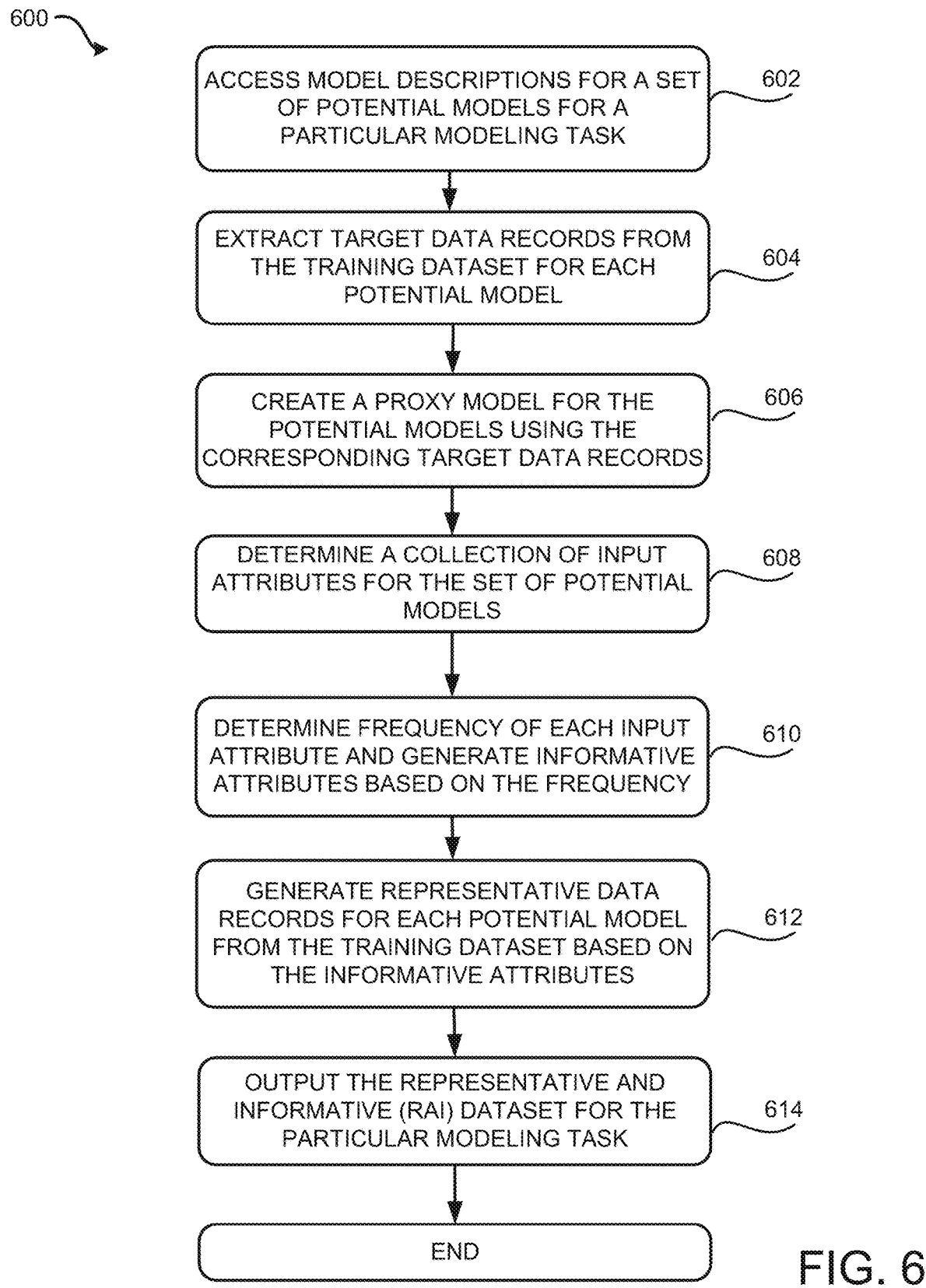
FIG. 6 is a flow chart depicting an example of a process for generating representative and informative datasets for a specific modeling task, according to certain aspects of the present disclosure.

FIG. 6 is a flow chart depicting an example of a process 600 for generating an RAI dataset 126 for a specific modeling task, according to certain aspects of the present disclosure. One or more computing devices (e.g., the model training server 110) implement operations depicted in FIG. 6 by executing suitable program code (e.g., the RAI dataset generation application 140). For illustrative purposes, the process 600 is described with reference to certain examples depicted in the figures. Other implementations, however, are possible.

At block 602, the process 600 involves accessing, by the RAI dataset generation application 140 in the model training server 110, model descriptions 144 for a set of potential machine learning models for a specific modeling task. Machine learning models can be classified into different categories based on the modeling tasks, such as models configured to predict aspects of different types of devices (e.g., laptop devices, smartphone devices, or server computers), models configured to predict aspects of devices executing different categories of tasks, models configured to predict aspects of devices executing different operating systems, and so on. In other examples, the categories of models may be based on a lending product, such as machine learning models configured to predict aspects of automobile loans, machine learning models configured to predict aspects of mortgage loans, and machine learning models configured to predict aspects of credit card loans. In some examples, the categories may be based on a type of loan, such as machine learning models configured to predict aspects of a revolving account that can provide a user with varying credit ability, and models configured to predict aspects of an installment account in which a user may borrow a set amount and return the amount over time. Another example of model categories can be based on a population of loan users, such as machine learning models configured to predict aspects of users with subprime credit scores, models configured to predict aspects of users with prime credit scores, and models configured to predict aspects of users with super-prime credit scores. Alternatively, the model categories can be based on the types of the models, such as marketing models or risk models.

For a particular modeling task, the model training server 110 can determine a set of potential models and each potential model is configured to make a prediction related to the modeling task. In the above example where the modeling task is to make risk predictions for server computers, the set of potential models can include a model for predicting a security risk for a server computer that is over a certain number of years old, a model for predicting a security risk for a server computer having a certain type of operating system, a model for predicting the security risk for a server computer that has a CPU usage over 80% daily, a model for predicting the security risk for a server computer having a certain type of CPU, a model for predicting the security risk for a server computer that is installed with a certain type of virus protection software, and so on. In an example where the modeling task is to predict risks associated with a user having a subprime credit score, the set of potential models can include a model for predicting the likelihood of default for subprime users on their automobile loans, a model for predicting the likelihood of default for subprime users on their credit card accounts, a model for predicting the likelihood of default for subprime users on their mortgage loans, and model for predicting the likelihood of default for subprime users with revolving accounts, and so on.

At block 604, the process 600 involves extracting, by the RAI dataset generation application 140, target data records from the initial training dataset 142 for each potential machine learning model. For example, if the modeling task is for predicting risk associating with lending to users with subprime credit scores, the RAI dataset generation application 140 can filter the initial training dataset 142 to extract target data records relevant to users with subprime credit scores and remove data records for other types of users. The RAI dataset 126 may be generated from these target data records. In some examples, the RAI dataset generation application 140 may identify a subset of the initial training dataset 142 from which the target data records for each potential machine learning model can be extracted. For example, the RAI dataset generation application 140 may filter auto loan users to extract users with subprime credit scores. In some examples, the subset can be 80-90% of the initial training dataset 142. By generating the target data record for each potential model from the subset of the initial training dataset 142 (instead of from the full initial training dataset 142), the computational complexity of the process can be reduced.

At block 606, the process 600 involves creating, by the RAI dataset generation application 140, a proxy machine learning model for each of the potential machine learning models using the corresponding target data records. The proxy machine learning model can be a model that is simple and requires fewer computations than the actual machine learning model to be built and trained. For example, the proxy machine learning model can be a decision tree model whose training complexity is linear to the number of attributes and the number of records in the target data records. The proxy machine learning model can be built using all attributes or representative attributes determined above in FIG. 3 from the target data records.

At block 608, the process 600 involves determining, by the RAI dataset generation application 140, a collection of input attributes for the set of potential machine learning models. The collection of input attributes may include the input attributes selected by the proxy machine learning models. At block 610, the process 600 involves determining, by the RAI dataset generation application 140, the frequency of each input attribute and generates informative attributes based on the frequency. The informative attributes may be attributes that are used more often than others by the potential machine learning models, such as attributes that have a higher frequency than a threshold value.

At block 612, the process 600 involves generating, by the RAI dataset generation application 140, representative data records for each potential machine learning model from the initial training dataset 142 based on the informative attributes determined in block 610. Block 610 is similar to block 310 of FIG. 3. The representative data records can be identified using a clustering algorithm, such as the high dimensional clustering technique discussed above with respect to FIG. 3. In some examples, the dataset on which the clustering algorithm is applied may be generated by filtering the initial training dataset 142 based on the respective model description of the respective potential machine learning model and further based on the informative attributes determined in block 610. Because the RAI dataset generation application 140 generates an RAI dataset 126 from the collection of representative data records that is based on multiple potential machine learning models for the particular modeling task, the RAI dataset 126 may cover a variety of use cases and can be used to train any machine learning model for the particular modeling task.

At block 614, the process 600 involves outputting, by the RAI dataset generation application 140, the RAI dataset 126 for the particular modeling task. Using the generated RAI dataset 126, the model training application 112 can train the machine learning model 120. The trained machine learning model 120 may be utilized by the risk assessment server 118 to predict the risk associated with the particular modeling task.

While the above description focuses on machine learning models used to predict risk indicators for controlling access to an online computing environment, the RAI dataset for any type of machine learning model can be generated in a similar way to train the respective models. For example, the machine learning model can be a model configured to predict aspects of a computing system (e.g., the likelihood of system overload), aspects of a computer network (e.g., network congestion), or other types of predictions.

Example of Computing System for
Machine-Learning Operations

Figure 7:
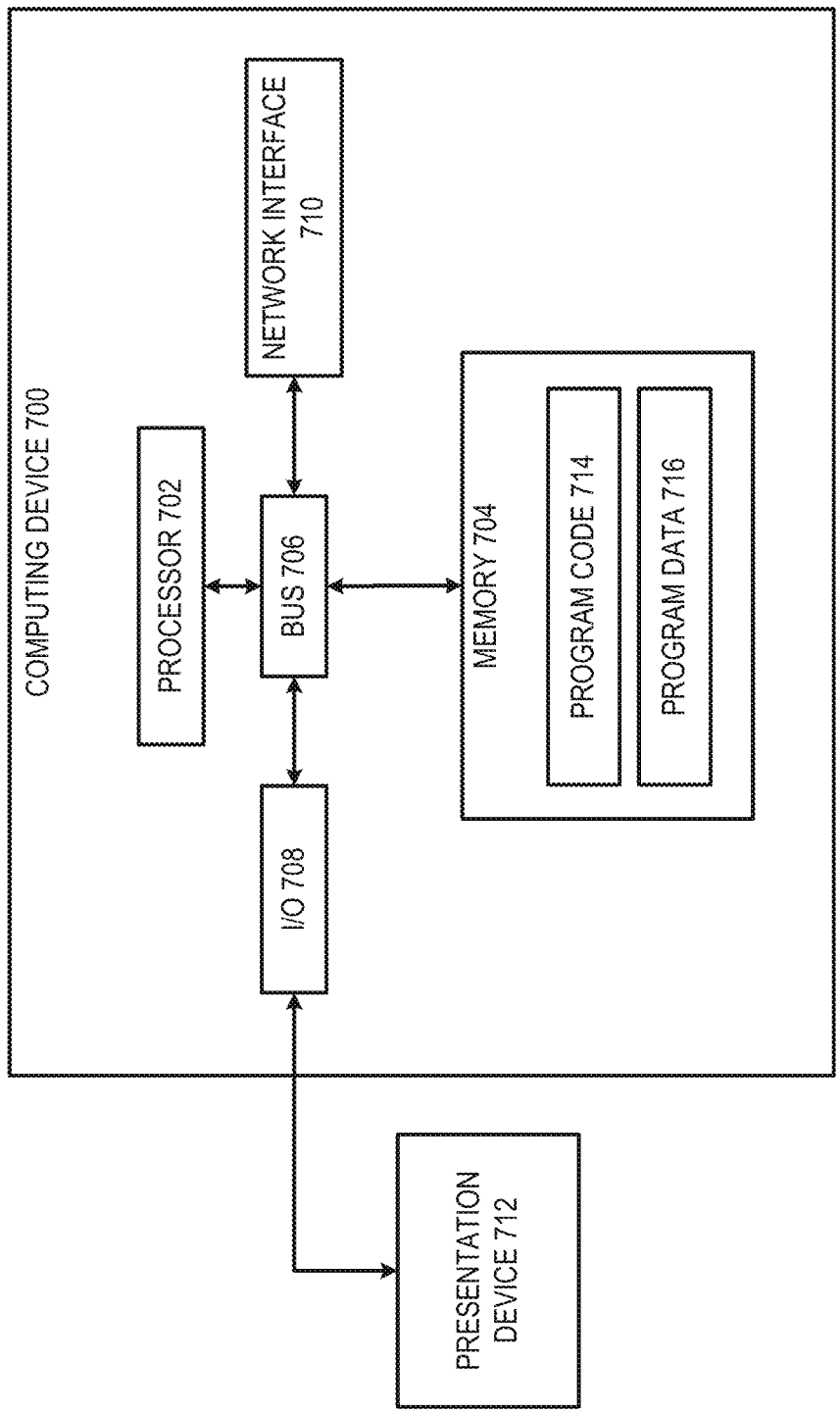
FIG. 7 is a block diagram depicting an example of a computing system suitable for implementing aspects of the techniques and technologies presented herein.

Any suitable computing system or group of computing systems can be used to perform the operations described herein. For example, FIG. 7 is a block diagram depicting an example of a computing device 700, which can be used to implement the risk assessment server 118, the model training server 110, or any other device for executing the RAI dataset generation application 140. The computing device 700 can include various devices for communicating with other devices in the operating environment 100, as described with respect to FIG. 1. The computing device 700 can include various devices for performing one or more operations described above with respect to FIGS. 1-6.

The computing device 700 can include a processor 702 that is communicatively coupled to a memory 704. The processor 702 executes computer-executable program code stored in the memory 704, accesses information stored in the memory 704, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 702 include a microprocessor, an application-specific integrated circuit, a field-programmable gate array, or any other suitable processing device. The processor 702 can include any number of processing devices, including one. The processor 702 can include or communicate with a memory 704. The memory 704 stores program code that, when executed by the processor 702, causes the processor to perform the operations described in this disclosure.

The memory 704 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, ROM, RAM, an ASIC, magnetic storage, or any other medium from which a computer processor can read and execute program code. The program code may include processor-specific program code generated by a compiler or an interpreter from code written in any suitable computer-programming language. Examples of suitable programming language include Hadoop, C, C++, C#, Visual Basic, Java, Python, Perl, JavaScript, ActionScript, etc.

The computing device 700 may also include a number of external or internal devices such as input or output devices. For example, the computing device 700 is shown with an input/output interface 708 that can receive input from input devices or provide output to output devices. A bus 706 can also be included in the computing device 700. The bus 706 can communicatively couple one or more components of the computing device 700.

The computing device 700 can execute program code 714 that includes the risk assessment application 114 and/or the model training application 112. The program code 714 for the risk assessment application 114, the RAI dataset generation application 140 and/or the model training application 112 may be resident in any suitable computer-readable medium and may be executed on any suitable processing device. For example, as depicted in FIG. 7, the program code 714 for the risk assessment application 114, the RAI dataset generation application 140 and/or the model training application 112 can reside in the memory 704 at the computing device 700 along with the program data 716 associated with the program code 714, such as the machine learning model 120, the predictor attributes 124, the initial training dataset 142, the model descriptions 144, and/or the RAI dataset 126. Executing the risk assessment application 114, the RAI dataset generation application 140, or the model training application 112 can configure the processor 702 to perform the operations described herein.

In some aspects, the computing device 700 can include one or more output devices. One example of an output device is the network interface device 710 depicted in FIG. 7. A network interface device 710 can include any device or group of devices suitable for establishing a wired or wireless data connection to one or more data networks described herein. Non-limiting examples of the network interface device 710 include an Ethernet network adapter, a modem, etc.

Another example of an output device is the presentation device 712 depicted in FIG. 7. A presentation device 712 can include any device or group of devices suitable for providing visual, auditory, or other suitable sensory output. Non-limiting examples of the presentation device 712 include a touchscreen, a monitor, a speaker, a separate mobile computing device, etc. In some aspects, the presentation device 712 can include a remote client-computing device that communicates with the computing device 700 using one or more data networks described herein. In other aspects, the presentation device 712 can be omitted.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

The invention claimed is:

1. A method that includes one or more processing devices performing operations comprising:
   receiving, from a remote computing device, a risk assessment query for a target entity;
   computing, responsive to the risk assessment query, an output risk indicator for the target entity by applying a machine learning model to values of informative attributes associated with the target entity, wherein the machine learning model is trained using training samples selected from a representative and informative (RAI) dataset, wherein the RAI dataset comprises representative data records with each of the representative data records comprising the informative attributes, and wherein the RAI dataset is created by:
      receiving an initial training dataset comprising a plurality of data records, each data record comprising a plurality of attributes;
      accessing model descriptions of a set of models that can be trained using the initial training dataset, wherein each model description comprises a list of input attributes of a respective model in the set of models;
      determining a collection of attributes that are used by the set of models based on the model descriptions;
      determining a frequency of use for each attribute in the collection of attributes;
      selecting the informative attributes based on the informative attributes having a higher frequency than a threshold value of frequency; and
      generating the representative data records based on values of the informative attributes in the plurality of data records; and
   transmitting, to the remote computing device, a responsive message including the output risk indicator for use in controlling access of the target entity to one or more interactive computing environments.

2. The method of claim 1, wherein generating representative data records based on values of the informative attributes in the plurality of data records comprises:
   generating temporary data records from the plurality of data records by removing attributes in the plurality of attributes other than the informative attributes; and
   selecting the representative data records from the temporary data records based on clustering the temporary data records.

3. The method of claim 1, wherein:
   the set of models comprises a set of potential models for a particular modeling task; and
   determining informative attributes comprises:
      determining a set of target representative data records for each potential model in the set of potential models;
      determining a collection of attributes that are used by the set of potential models;
      determining a frequency of use for each attribute in the collection of attributes; and
      selecting the informative attributes based on the informative attributes having a higher frequency than a threshold value of frequency.

4. The method of claim 3, wherein determining a set of target representative data records for a potential model comprises filtering the plurality of data records based on applicability criterion in a model description of the potential model.

5. The method of claim 3, wherein determining informative attributes further comprises creating a proxy model for a potential model using the set of target representative data records for the potential model, wherein the attributes used by the potential model are determined to be attributes used by the proxy model.

6. The method of claim 5, wherein the proxy model is created using the plurality of attributes or a subset of the plurality of attributes of the set of target representative data records for the potential model.

7. The method of claim 3, wherein determining informative attributes further comprises generating a subset of data records from the plurality of data records, and wherein the set of target representative data records for each potential model in the set of potential models are determined from the subset of data records.

8. The method of claim 3, wherein generating representative data records based on values of the informative attributes in the plurality of data records comprises:
generating representative data records for each potential model in the set of potential models based on values of the informative attributes in the plurality of data records.

9. A system comprising:
a processing device; and
a memory device in which instructions executable by the processing device are stored for causing the processing device to perform operations comprising:
receiving, from a remote computing device, a risk assessment query for a target entity;
computing, responsive to the risk assessment query, an output risk indicator for the target entity by applying a machine learning model to values of informative attributes associated with the target entity, wherein the machine learning model is trained using training samples selected from a representative and informative (RAI) dataset, and wherein the RAI dataset comprises representative data records with each of the representative data records comprising the informative attributes and the RAI dataset is created by:
receiving an initial training dataset comprising a plurality of data records, each data record comprising a plurality of attributes;
accessing model descriptions of a set of models that can be trained using the initial training dataset, wherein each model description comprises a list of input attributes of a respective model in the set of models;
determining a collection of attributes that are used by the set of models based on the model descriptions;
determining a frequency of use for each attribute in the collection of attributes;
selecting the informative attributes based on the informative attributes having a higher frequency than a threshold value of frequency; and
generating the representative data records based on values of the informative attributes in the plurality of data records; and
transmitting, to the remote computing device, a responsive message including the output risk indicator for use in controlling access of the target entity to one or more interactive computing environments.

10. The system of claim 9, wherein generating representative data records based on values of the informative attributes in the plurality of data records comprises:
generating temporary data records from the plurality of data records by removing attributes in the plurality of attributes other than the informative attributes; and
selecting the representative data records from the temporary data records based on clustering the temporary data records.

11. The system of claim 9, wherein:
the set of models comprises a set of potential models for a particular modeling task; and
determining informative attributes comprises:
determining a set of target representative data records for each potential model in the set of potential models;
determining a collection of attributes that are used by the set of potential models;
determining a frequency of use for each attribute in the collection of attributes; and
selecting the informative attributes based on the informative attributes having a higher frequency than a threshold value of frequency.

12. A non-transitory computer-readable storage medium having program code that is executable by a processor device to cause a computing device to perform operations, the operations comprising:
computing, responsive to a risk assessment query for a target entity received from a remote computing device, an output risk indicator for the target entity by applying a machine learning model to values of informative attributes associated with the target entity, wherein the machine learning model is trained using training samples selected from a representative and informative (RAI) dataset, and wherein the RAI dataset comprises representative data records with each of the representative data records comprising the informative attributes and the RAI dataset is created by:
receiving an initial training dataset comprising a plurality of data records, each data record comprising a plurality of attributes;
accessing model descriptions of a set of models that can be trained using the initial training dataset, wherein each model description comprises a list of input attributes of a respective model of the set of models;
determining a collection of attributes that are used by the set of models based on the model descriptions;
determining a frequency of use for each attribute in the collection of attributes;
selecting the informative attributes based on the informative attributes having a higher frequency than a threshold value of frequency; and
generating the representative data records based on values of the informative attributes in the plurality of data records; and
causing a responsive message including the output risk indicator to be transmitted to the remote computing device for use in controlling access of the target entity to one or more interactive computing environments.

13. The non-transitory computer-readable storage medium of claim 12, wherein generating representative data records based on values of the informative attributes in the plurality of data records comprises:
generating temporary data records from the plurality of data records by removing attributes in the plurality of attributes other than the informative attributes; and selecting the representative data records from the temporary data records based on clustering the temporary data records.

14. The non-transitory computer-readable storage medium of claim 12, wherein:
the set of models comprises a set of potential models for a particular modeling task; and
determining informative attributes comprises:
determining a set of target representative data records for each potential model in the set of potential models;
determining a collection of attributes that are used by the set of potential models;
determining a frequency of use for each attribute in the collection of attributes; and
selecting the informative attributes based on the informative attributes having higher frequency than a threshold value of frequency.

* * * * *